United States Patent
Aerts et al.

(10) Patent No.: US 9,469,784 B2
(45) Date of Patent: Oct. 18, 2016

(54) METHOD FOR PRODUCTION OF A BINDER COMPOUND

(71) Applicant: S.A. Imperbel N.V., Lot (BE)

(72) Inventors: Hans Aerts, Lot (BE); Eric Bertrand, Lot (BE); Arnaud Boisdenghien, Lot (BE)

(73) Assignee: S. A. Imberbel N.V., Lot (BE)

( * ) Notice: Subject to any disclaimer, the term of this patent is extended or adjusted under 35 U.S.C. 154(b) by 0 days.

(21) Appl. No.: 13/727,900

(22) Filed: May 3, 2013

(65) Prior Publication Data

US 2014/0024757 A1    Jan. 23, 2014

(30) Foreign Application Priority Data

Dec. 27, 2011 (BE) .................................. 2011/0763

(51) Int. Cl.
*C09D 191/00* (2006.01)
*C08K 5/098* (2006.01)

(52) U.S. Cl.
CPC ............. *C09D 191/00* (2013.01); *C08K 5/098* (2013.01)

(58) Field of Classification Search
CPC ............................ C08K 5/098; C09D 191/00
See application file for complete search history.

(56) References Cited

U.S. PATENT DOCUMENTS

| | | | |
|---|---|---|---|
| 3,602,931 A | 9/1971 | MacArthur | |
| 4,206,007 A * | 6/1980 | Force | 156/72 |
| 4,515,002 A | 5/1985 | Groethe | |
| 4,643,847 A * | 2/1987 | Sanderson | 530/218 |
| 7,303,623 B2 * | 12/2007 | Bailey | 106/461 |
| 2007/0049664 A1 * | 3/2007 | Partanen | 524/60 |

* cited by examiner

*Primary Examiner* — Ling Choi
*Assistant Examiner* — Lanee Reuther
(74) *Attorney, Agent, or Firm* — Jacobson Holman PLLC

(57) ABSTRACT

Method for production of a binder compound wherein crude tall oil pitch is mixed with calcium hydroxide or calcium oxide, and wherein after mixing the crude tall oil pitch with the calcium hydroxide or calcium oxide, the mixture of crude tall oil pitch and calcium hydroxide or calcium oxide is allowed to react and then again further crude tall oil pitch and a polymer are added to the reacted mixture in order to obtain a base substance for the production of a roof covering membrane, a road surfacing material or a carpet backing.

16 Claims, No Drawings

METHOD FOR PRODUCTION OF A BINDER COMPOUND

The invention concerns a method for production of a binder compound, wherein crude tall oil pitch is mixed with calcium hydroxide or calcium oxide.

The mixing of crude tall oil pitch with calcium hydroxide or calcium oxide is known from U.S. Pat. No. 4,515,002.

Crude tall oil is a waste stream from the wood industry, in particular the paper industry. It is amongst others a by-product from the pulping of mainly conifers and is composed inter alia of resins, non-saponifiable sterols, resin acids, fatty acids, fatty alcohols, sterols and other alkyl hydrocarbon derivatives. By distillation of crude tall oil, this is fractioned inter alia into tall oil resins and pitch. The base fraction or the residue of this distillation is called crude tall oil pitch (CTO pitch) and mainly comprises compounds with a high boiling point and high molecular weight which are formed as a result of the high temperatures during the fractioning process. Crude tall oil pitch is typically a mixture of fatty acids, esterified fatty acids, resin acids and non-saponifiable constituents.

The known binder compound of crude tall oil pitch with calcium hydroxide has properties which are a priori comparable with those of bitumen. The binder compound thus liquefies on warming and solidifies again on cooling. Also with regard to its viscosity, the known binder compound has values comparable with those of bitumen.

Although the known binder compound, in view with its relationship with bitumen, can be used a priori as a base substance for products such as roof covering membranes, cold adhesives, mastic, primer, road surfacing or carpet backing, research has shown that problems occur when the known binder compound is used for this. Both at a normal temperature of 20° C. and at lower temperatures, it does not have the desired flexibility necessary for the usual properties of these products. In addition the service life is substantially shorter because the membranes, road surfacing or carpet backing produced from this break on application or after a period of 2 to 3 years. The lack of flexibility of the known compound is furthermore described in column 2 line 57 of said US patent. As a solution to this problem the prior art suggests mixing maleic acid anhydride with the binder compound and allowing it to react for 1.5 hours at a temperature of 200° C. This is not only an expensive solution but also a hazardous solution in view of the aggressive nature of the acid.

The object of the invention is to propose a method for production of a binder compound wherein crude tall oil pitch and calcium hydroxide or calcium oxide are mixed together and which is usable as a high-quality base substance for the production of a roof covering membrane, a cold adhesive, a primer, a mastic, a road surfacing or a carpet backing.

A method according to the invention is therefore characterised in that after mixing the crude tall oil pitch with the calcium hydroxide or calcium oxide, the mixture of crude tall oil pitch and calcium hydroxide or calcium oxide is left to react and then further crude tall oil pitch and a polymer are added to the reacted mixture in order to produce a base substance for the production of a roof covering membrane, a cold adhesive, a primer, a mastic, a road surfacing material or a carpet backing. Surprisingly it has been found that by first allowing the mixture to react and then adding further crude tall oil pitch and a polymer to the reacted mixture, a mixture is obtained which has a greater flexibility at a temperature of around 20° C. or lower, or even at negative temperatures, and a substantially longer life. Simulation tests on a membrane have shown that even after 10 years and after exposure to various weather conditions, no breaks had occurred in the membrane.

A first preferred embodiment of a method according to the invention is characterised in that to obtain the mixture, between 80 and 97 weight percent crude tall oil pitch and between 3 and 20 weight percent calcium hydroxide or calcium oxide are mixed at a temperature of around 140° C., and wherein the mixture is allowed to react for at least 15 minutes. A setting time of at least 15 minutes is necessary to give a membrane or carpet backing a service life of at least 10 years.

A second preferred embodiment of a method according to the invention is characterised in that the ratio between the mixture and the again added further crude tall oil pitch is between 10/90 and 90/10. The more crude tall oil pitch is added, the more flexible the binder compound will become.

Further advantages and embodiments of the invention are described below.

Traditionally, bitumen is a waste product of the petrochemical industry which offers a cheap and high-quality raw material for the production of roof covering membranes, cold adhesives, primers, mastic, carpet backing or asphalt. Due to the rising demand for petroleum products for use in chemical industry and as fuel, the availability of high-quality bitumen has diminished greatly while the price has increased. So what was regarded as a waste product just a few years ago is now a source of further usable materials, whereby the quality of what is now regarded as waste has diminished. In addition the use of bituminous products also has a harmful influence on the environment because the production thereof imposes a great environmental strain. Another disadvantage of the use of bitumen is the acidification of rainwater as a consequence of the interaction of UV light with bitumen.

The use of crude tall oil pitch, crude tall oil and/or derivatives thereof offers an ecological benefit because for this a waste stream is used as a "second-generation" renewable raw material. In addition crude tall oil pitch is ecologically more responsible than a "first-generation" renewable raw material because it is not in competition with the food chain.

By mixing crude tall oil pitch with calcium hydroxide (CaOH) or with calcium oxide (CaO), a binder compound is obtained which is comparable with bitumen because it liquefies on warming and solidifies again on cooling. CaOH is preferred as this is less aggressive than CaO. The viscosity of the binder compound according to the invention, which is between 50,000 and 400,000 mPa·s at a temperature of 180° C., and its penetration value between 10 and 500 1/10 dmm at 25° C., are comparable with those of bitumen. Consequently the binder compound can form a suitable substitute for bitumen because it is more environmentally friendly and because it primarily consists of a waste material which has a price comparable to that of bitumen. Experiments have however shown that the straight substitution of bitumen by the binder compound leads to problems of flexibility and too short a product life if the binder compound is used for production of roof covering membranes, road surfacing or carpet backing. Table 1 below gives the measurement results for two compounds.

TABLE 1

| Constituents | Compound 1 in weight percent | Compound 2 in weight percent |
|---|---|---|
| Crude tall oil pitch | 43 | 45 |
| Ca(OH)2 | 3 | 5.6 |
| Filler | 39 | 33 |
| Measurement results | | |
| Viscosity in mPa · s at 180° C. | 8425 | 17,000 |
| Softening point in ° C. | 147 | 115 |
| Penetration at 60° C. in dmm | 113 | 56 |
| Cold flexion when new (° C.) | −8 | 20 |
| Cold flexion after seven days at 70° C. (° C.) | 0 | 20 |
| Cold flexion after 28 days at 70° C. (° C.) | 4 | 20 |

The term "cold flexion" means the temperature at which the binder breaks. Table 1 shows that the values of the viscosity and penetration are insufficient to produce a suitable membrane. Also the value of the cold flexion is inadequate in view of the negative temperatures which are not uncommon.

Surprisingly the inventors have found that if the mixture of crude tall oil pitch and/or derivatives thereof with CaOH or CaO is first allowed to react and then further crude tall oil pitch and a polymer are added to the reacted mixture, a substantially better binder compound is obtained which is particularly suitable for roof covering membranes, road surfacing or carpet backing.

In a preferred embodiment of the method according to the invention, the mixture contains between 80 and 97 weight percent crude tall oil pitch and between 3 and 20 weight percent CaOH or CaO. The crude tall oil pitch is mixed with the CaOH or CaO at a temperature of around 140° C. and the mixture is allowed to react for at least 15 minutes. Preferably the time for reaction is between 15 and 120 minutes. With such a reaction time, a stable mixture is obtained wherein the CaOH or CaO molecules have had sufficient interaction with the crude tall oil pitch and are firmly anchored in the network of the crude tall oil pitch. As a result a mixture is obtained which is very suitable amongst others for roof covering membranes because it has sufficient flexibility and life.

Suitable polymers to be added are amongst others styrene-butadiene-styrene (SBS), styrene-ethylene-butene-styrene (SEBS), styrene-isoprene-styrene (SIS), polyisobutylene (PIB), polyhydroxybutyrate, polyolefins, polyvinylbutignal (PVB), atactic polypropylene (APP), isotactic polypropylene (IPP), or thermoplastic polyurethane (TPU) of renewable or petrochemical origin.

The ratio between the mixture and the further added crude tall oil pitch is between 10/90 and 90/10, wherein as the quantity of further added crude tall oil pitch rises, the flexibility of the resulting end product increases.

Table 2 shows four (3, 4, 5, 6) binder compounds according to the invention. The pre-mixture contains 93 weight % crude tall oil pitch and 7 weight % Ca(OH)2 which was mixed at a temperature of 140° C. and reacted for 15 minutes.

TABLE 2

| Constituents in weight % | 3 | 4 | 5 | 6 |
|---|---|---|---|---|
| Crude tall oil pitch | 47 | 44 | 42 | 39 |
| Premixture | 5 | 8 | 10 | 13 |
| SBS | 15 | 15 | 15 | 15 |
| Filler | 33 | 33 | 33 | 33 |
| Measurement results | | | | |
| Viscosity in mPa · s at 180° C. | 11 705 | 7 440 | 6 015 | 8 870 |
| Softening point in ° C. | 134 | 142 | 142 | 140 |
| Penetration at 60° in dmm | 136 | 131 | 115 | 108 |
| Cold flexion when new (° C.) | −42 | −32 | −32 | −22 |
| Cold flexion after seven days at 70° C. (° C.) | −42 | −28 | −28 | −20 |
| Cold flexion after 28 days at 70° C. (° C.) | −36 | | | |

It can be concluded from table 2 that the values for viscosity and penetration now lie well within the required range.

It is furthermore possible to add to the mixture inert fillers such as calcium carbonate and fillers with fire-resistant properties such as for example colemanite or aluminium hydroxide.

The following compounds are preferred:
1. 0.5-30 weight percent polymer, 0-80 weight percent filler for a maximum of 80 weight percent mixture;
2. between 30 and 70 weight percent mixture, between 1 and 20 weight percent polymer, and between 5 and 60 weight percent filler;
3. between 40 and 65, and more preferably between 51 and 57 weight percent mixture, between 20 and 50 weight percent filler and between 4 and 14, and more preferably between 8 and 14, weight percent polymer.

The ratios are determined as a function of the desired properties of the resulting end product.

The invention claimed is:

1. A method for production of a binder compound wherein crude tall oil pitch is mixed with calcium hydroxide or calcium oxide, wherein after mixing the crude tall oil pitch with the calcium hydroxide or calcium oxide, the mixture of crude tall oil pitch and calcium hydroxide or calcium oxide is allowed to react for at least 15 minutes and then again further crude tall oil pitch and a polymer are mixed with the reacted mixture in order to obtain a base substance for the production of a roof covering membrane, a road surfacing material or a carpet backing.

2. The method according to claim 1, wherein to obtain a mixture, between 80 and 97 weight percent crude tall oil pitch and between 3 and 20 weight percent calcium hydroxide or calcium oxide are mixed at a temperature of approximately 140° C.

3. The method according to claim 1, wherein the ratio between the mixture and the again further crude tall oil pitch is between 10/90 and 90/10.

4. The method according to claim 1, wherein further fillers are added to the reacted mixture.

5. The method according to claim 1, wherein between 30 to 70 weight percent mixture with further crude tall oil pitch are mixed with between 1 to 20 weight percent-polymer, and with 5 to 60 weight percent fillers.

6. The method according to claim 5, wherein between 40 to 65 weight percent mixture with further crude tall oil pitch are mixed.

7. The method according to claim 5, wherein between 51 and 57 weight percent mixture with further crude tall oil pitch are mixed.

8. The method according to claim 5, wherein between 4 to 19 weight percent polymer are mixed.

9. The method according to claim 5, wherein between 8 to 14 weight percent polymer are mixed.

10. The method according to claim 5, wherein between 20 to 50 weight percent fillers are mixed.

11. A roof covering membrane produced with a binder compound obtained by application of the method according to claim 1.

12. A road surfacing compound produced with a binder compound obtained by application of the method according to claim 1.

13. A carpet backing produced with a binder compound obtained by application of the method according to claim 1.

14. A cold adhesive produced with a binder compound obtained by application of the method according to claim 1.

15. A mastic produced with a binder compound obtained by application of the method according to claim 1.

16. A primer produced with a binder compound obtained by application of the method according to claim 1.

* * * * *